W. G. MOFFET.
AUTOMATIC MACHINE.
APPLICATION FILED APR. 29, 1915.
1,162,301.
Patented Nov. 30, 1915.
7 SHEETS—SHEET 4.
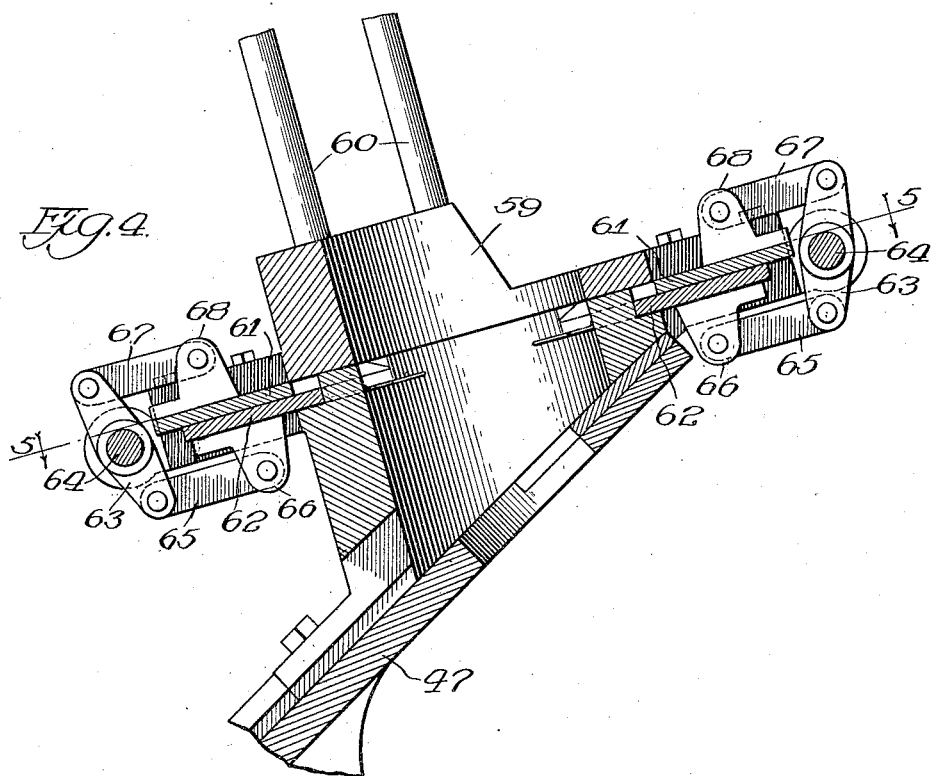
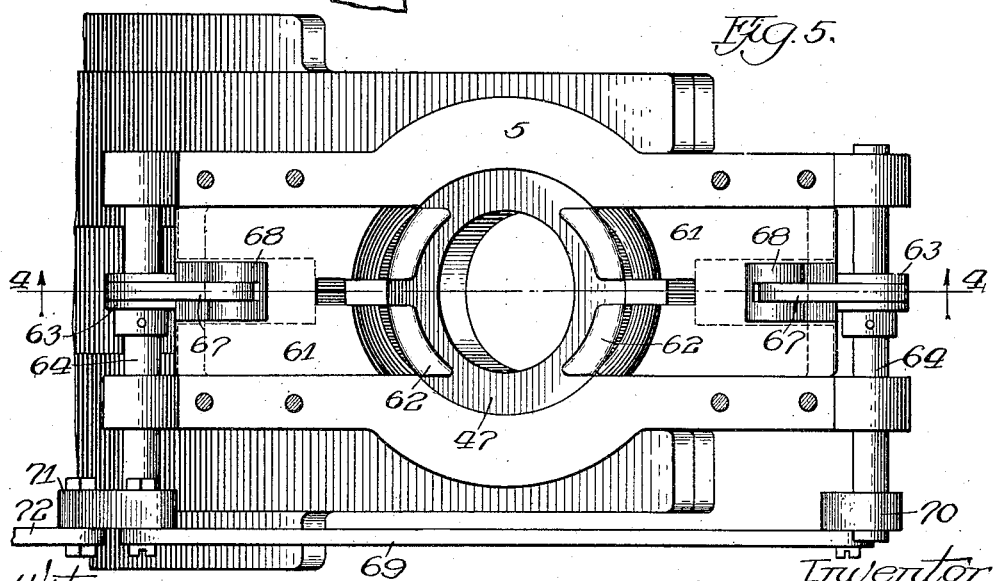

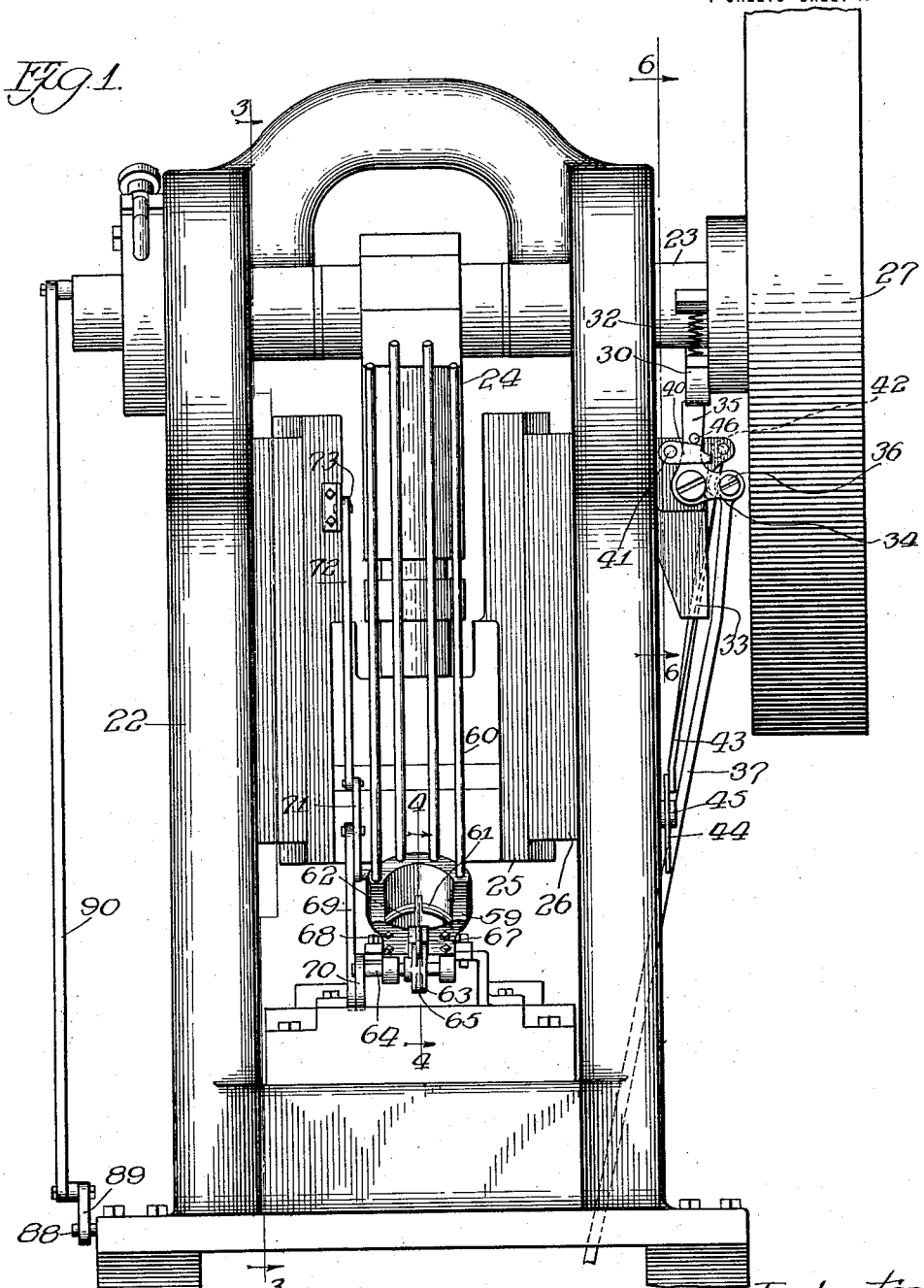

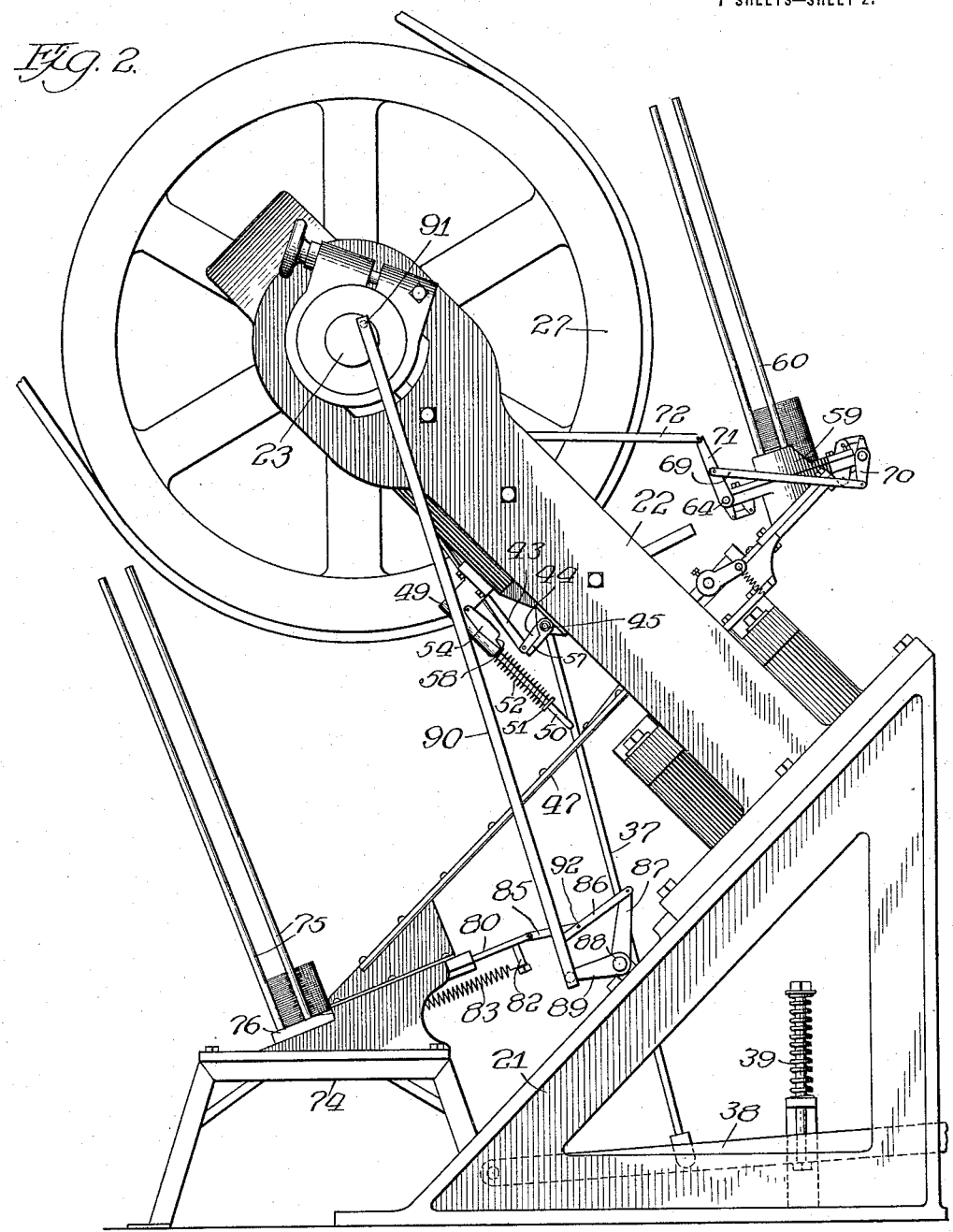

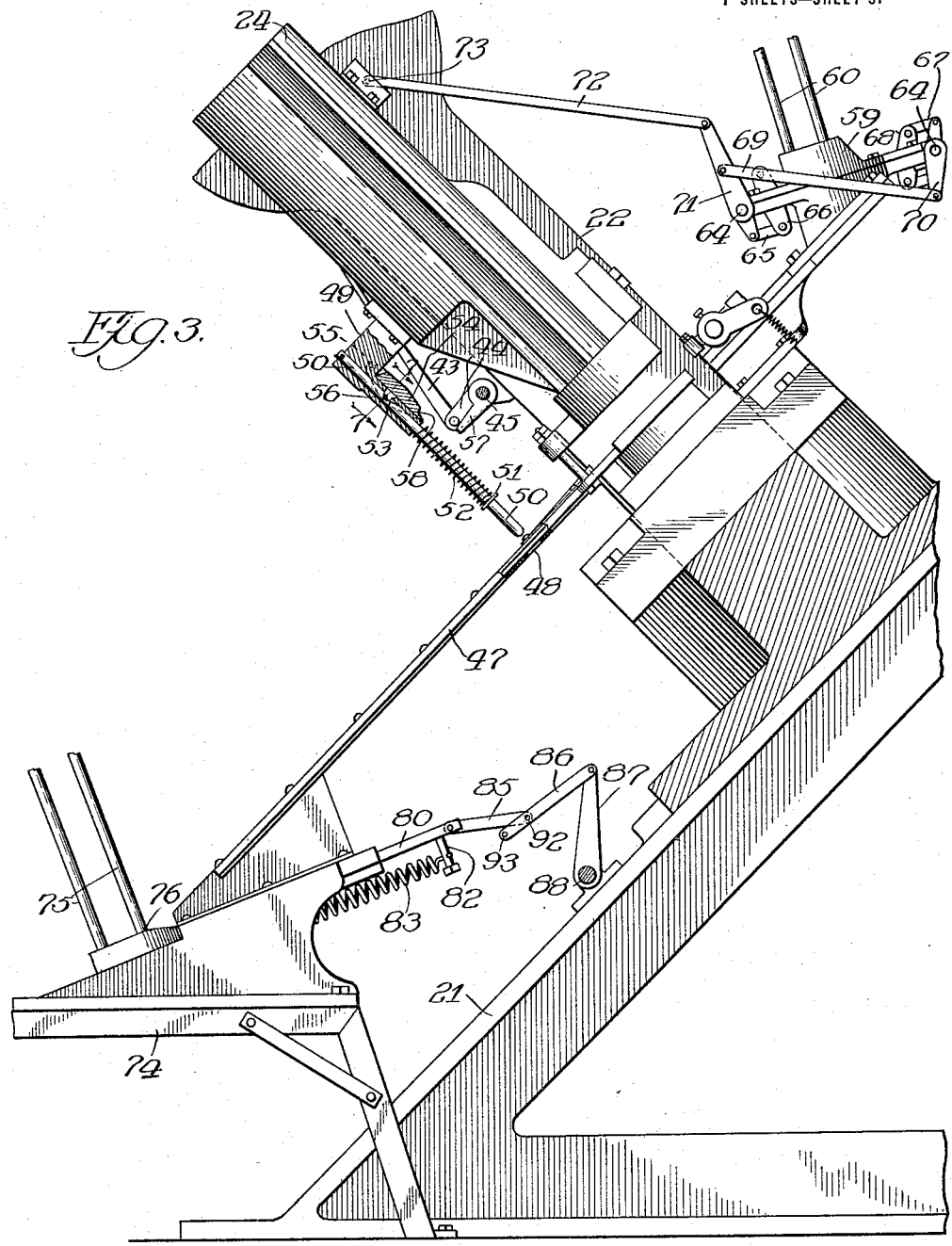

W. G. MOFFET.
AUTOMATIC MACHINE.
APPLICATION FILED APR. 29, 1915.
1,162,301.
Patented Nov. 30, 1915.
7 SHEETS—SHEET 5.
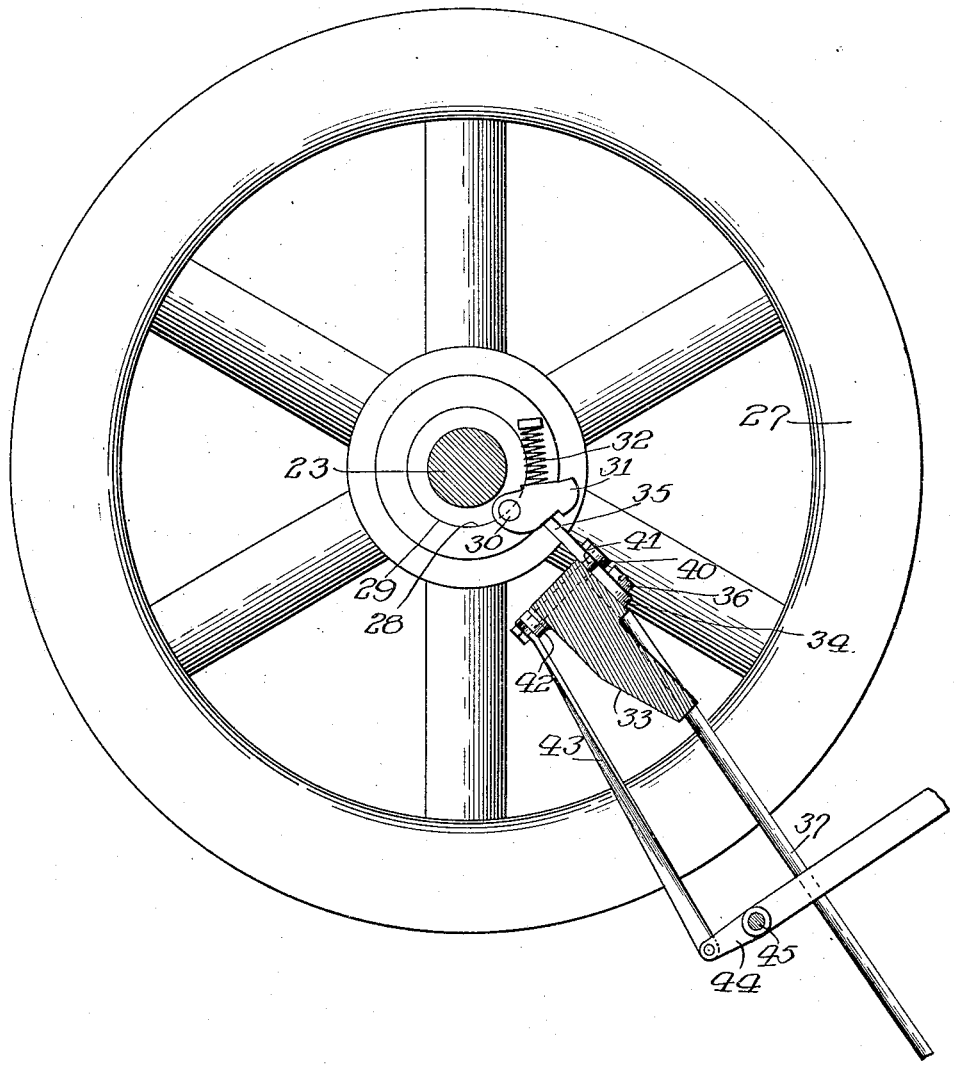
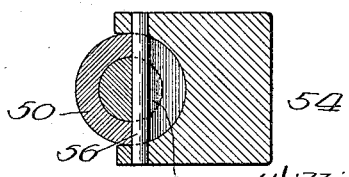

W. G. MOFFET.
AUTOMATIC MACHINE.
APPLICATION FILED APR. 29, 1915.
1,162,301.
Patented Nov. 30, 1915.
7 SHEETS—SHEET 6.
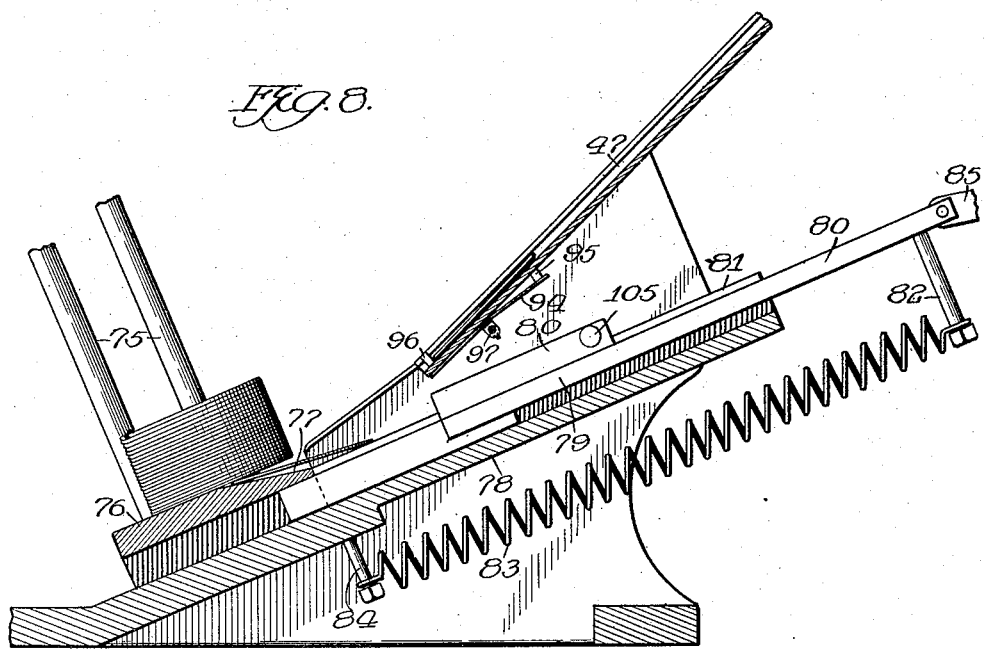
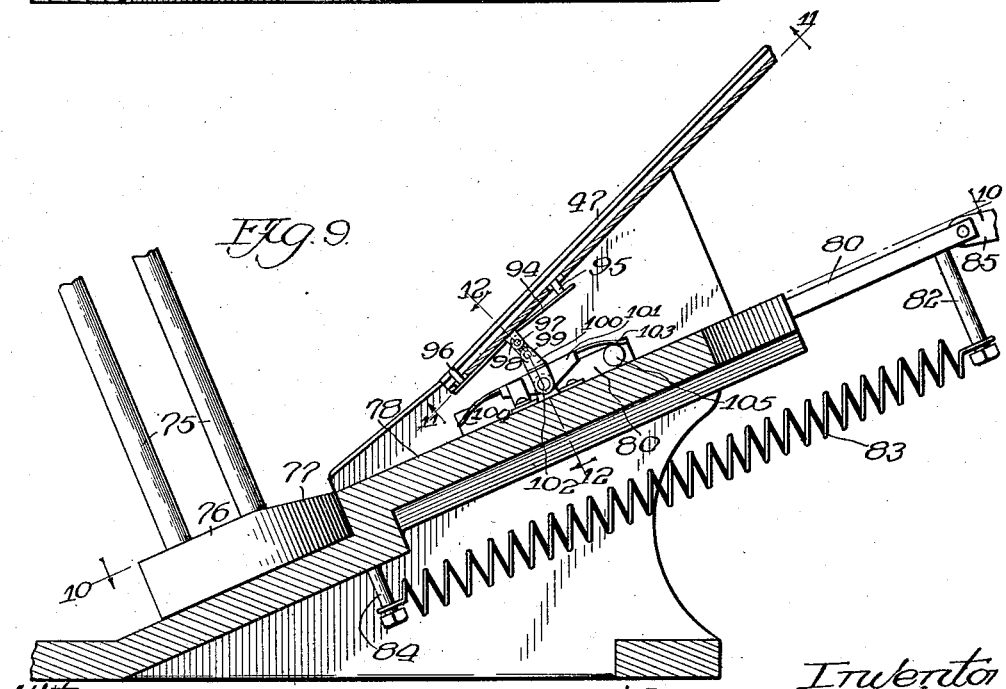

W. G. MOFFET.
AUTOMATIC MACHINE.
APPLICATION FILED APR. 29, 1915.
1,162,301.
Patented Nov. 30, 1915.
7 SHEETS—SHEET 7.
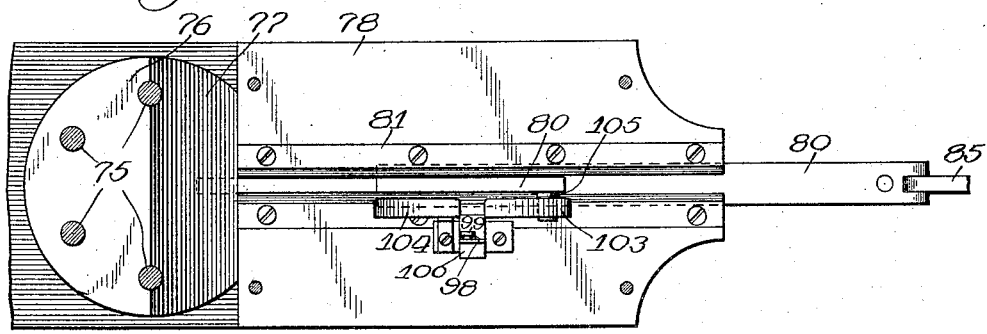
FIG. 10.
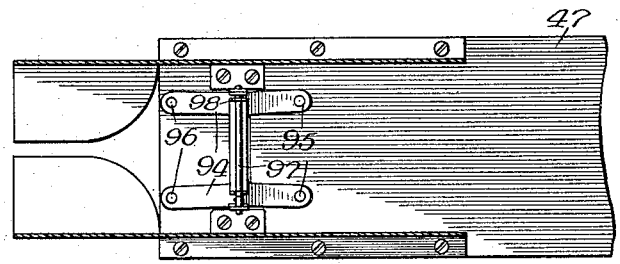
FIG. 11.
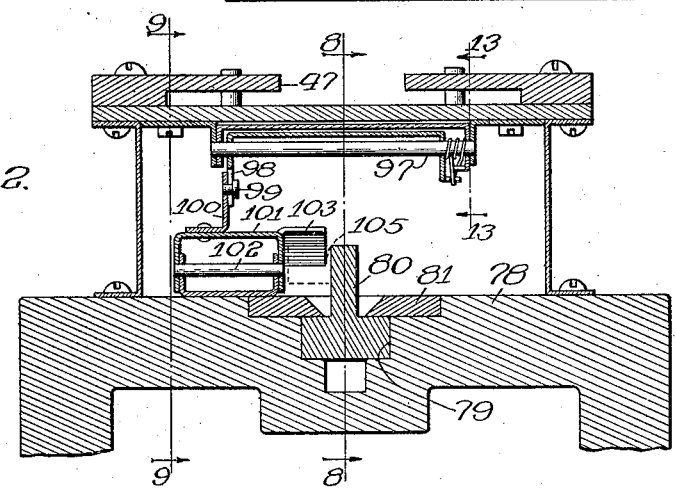
FIG. 12.
FIG. 13.
Witnesses:
Inventor
William G. Moffet
By ........... Atty.
COLUMBIA PLANOGRAPH CO., WASHINGTON, D. C.

UNITED STATES PATENT OFFICE.

WILLIAM G. MOFFET, OF CHICAGO, ILLINOIS.

AUTOMATIC MACHINE.

1,162,301.　　　　　Specification of Letters Patent.　　Patented Nov. 30, 1915.

Application filed April 29, 1915.　Serial No. 24,638.

*To all whom it may concern:*

Be it known that I, WILLIAM G. MOFFET, a citizen of the United States, residing at Chicago, in the county of Cook and State of Illinois, have invented certain new and useful Improvements in Automatic Machines, of which the following is a specification.

In the manufacture of small articles of metal which undergo successive operations it is desirable, so far as possible, to reduce the number of operatives by making the machines automatic in their operation, extending such automatic features not only to the feeding of the material thereto and the stacking of the articles coming from the machine, but also to the stopping of the machine in case of accident.

It is the object of the present invention to provide in a machine for working sheet metal articles, such for instance as can tops or the like, automatic mechanism simple in construction and efficient in operation whereby a single operative can attend to a number of machines, the feeding of the material to the machine and the stacking of the product as it comes from the machine being entirely automatic, and also provision being made whereby upon any interruption of the machine's action, such as that caused by the jamming of articles therein, the machine will be immediately brought to a standstill.

In order that the invention may be readily understood a preferred embodiment of the same is set forth in the accompanying drawings and in the description based thereon.

Obviously the invention is susceptible of embodiment in varied constructional forms other than that shown, wherefore the drawing and description are to be taken in an illustrative and not in an unnecessarily limiting sense.

In the drawings—Figure 1 is a front elevation of a machine for acting upon can tops and embodying the present invention; Fig. 2 is a side elevation of the same machine; Fig. 3 is a vertical section on the line 3—3 of Fig. 1; Fig. 4 is an enlarged detail section on the line 4—4 of Fig. 1; Fig. 5 is a transverse section on the line 5—5 of Fig. 4; Fig. 6 is a detail view of the clutch operating mechanism; Fig. 7 is a transverse section on the line 7—7 of Fig. 3; Fig. 8 is an enlarged view in vertical section through the automatic stacking mechanism taken on the line 8—8 of Fig. 12; Fig. 9 is a similar view taken on the line 9—9 of Fig. 12; Fig. 10 is a top plan view on the line 10—10 of Fig. 9; Fig. 11 is a bottom plan view on the line 11—11 of Fig. 9; Fig. 12 is a section on the line 12—12 of Fig. 9; and Fig. 13 is a sectional detail view on the line 13—13 of Fig. 12.

As illustrated the machine includes the frame 21 upon which the inclined standards 22 are supported having journaled in their upper portions the drive shaft 23 eccentrically connected to the reciprocating member 24 guided in its lower portion by means of the coöperating guide members 25—26 and carrying a suitable die for acting upon the articles, all of which arrangement is old and well known. The shaft 23 is suitably driven by means of the fly wheel 27 connected to said shaft by a clutch of the well known half round pin and socket type. The complementary surfaces 28 and 29 of the fly wheel and shaft respectively being each provided with one-half of a circular recess or socket and the former having journaled therein a half round pin 30, to which is attached a dog 31 under the control of the spring 32 which tends to rotate the pin 30 in such manner as to form an interlocking driving connection between the fly wheel and shaft.

Mounted upon the bracket 33 at the side of the machine is an angle lever 34 one arm 35 of which is adapted to engage a notch of the dog 31 whereby to hold the same against the tension of the spring 32 with the pin 30 out of interlocking engagement with the shaft. The other arm of the angle lever is pivoted at 36 to a link rod 37 which is connected at its lower end to a pedal 38 downwardly pressed under the influence of the spring 39. A catch 40 is pivoted to the bracket 33 by a pin 41 and extending through said bracket and having fixed upon the opposite side thereof an arm 42, which is connected by means of the link rod 43 with a lever 44 fixed to a rock shaft 45 journaled in the machine frame and overbalanced or counterweighted at its outer end.

In case the operator desires to throw in the clutch and effect the driving of the machine from the fly wheel 27 he presses upon the pedal 38 and thereby releases the dog 31 and permits the spring 32 to effect the coupling of the parts. If the foot be then removed from the pedal the dog 31 would make one revolution around the shaft with the fly wheel and would be arrested by the arm 35 of the angle lever throwing out the clutch, if it were not for the counterweighting of the lever 44, which causes the outer end of the same to drop lifting the arm 42 and causing the catch 40 to engage the pin 46 of the arm 35 holding the latter in engagement with the dog 31. By thereafter lifting the lever handle 44 the catch 40 will release the pin 46 and permit the arm 35 to engage the dog 31 under the action of the spring 39.

The automatically acting means provided for the stopping of the machine in case of accident or interruption in the passage of material to the machine will now be described. A chute 47 leads from the automatic feeding mechanism, to be hereafter described, through the machine to the automatic stacking means, hereafter to be described. This chute, along which the articles travel by gravity as they leave the die, is provided at a point adjacent the die with a transverse aperture 48 (Fig. 3), and the reciprocating member 24 has mounted thereon a bracket 49 within which is mounted a finger 50 for reciprocating movement in line with said aperture 48 so that normally the finger will be projected through the aperture and withdrawn therefrom at each stroke of the machine. The finger 50 has a shoulder 51 thereon and between said shoulder and the lower edge of the bracket the finger is enveloped by a compression spring 52 which normally holds the finger yieldingly extended. The upper portion of the finger within its bearing in the bracket 49 is notched at 53 to provide a cam face. A latch 54 is pivoted at 55 to swing from the bracket 49 and carries a pin 56 which normally lies within the notch 53 above the cam face. The rock shaft 45, to which is secured the handle 44 of the clutch operating mechanism, has also secured thereto an arm 57 which projects beneath the bracket 49 adjacent the normal path of the latch 54. In the regular operation of the machine the pin 50 will move freely with the reciprocating member 24, but if, for any reason the articles become jammed within the chute 47 so as to obstruct the aperture 48 the finger 50 striking one of the articles will be arrested compressing the spring 52 and causing the cam face at 53 to act upon the pin 56 throwing the latch to the right (Fig. 3) whereupon the notch 58 on the lower end of the latch will strike the arm 57 rocking the shaft 45 and thereby releasing the pin 46 of the arm 35 from the catch 40 and permitting the said arm 35 to engage the dog 31 and throw out the clutch stopping the machine.

Provision is made for feeding the articles individually to the machines in the manner following: At the entrance to the chute 47 above the die is arranged a feed magazine 59, uprights 60 being employed to form the walls of the magazine for the retention of a vertical stack of the articles. Within the lower portion of the magazine are arranged in superposed relation a pair of upper feed plates 61 and a pair of lower feed plates 62, the members of each pair mounted for reciprocation toward and from each other and the reciprocating movement of the two pairs being in alternation so that the lowermost article of the stack will be dropped upon the lower feed plates and the upper feed plates will approach each other so as to support the stack while the lower feed plates withdraw and permit the article held thereby to drop in the chute in a well known manner. To effect this alternating reciprocating movement vertically disposed rocker beams 63, 63 are mounted at the two sides of the magazine upon shafts 64, 64. The lower end of each rocker beam is connected by a link 65 with a stud 66 carried by one of the members 62 of the lower pair of feed plates while the upper end of each rocker beam is connected by a link 67 with a stud 68 carried by one of the members 61 of the upper pair of feed plates. The two rocker beams 64 are cross-connected by means of a link 69 extending diagonally between the arms 70 and 71 forming in effect downward and upward extensions respectively of the rocker beams 63, said extensions being here shown as separate arms 70 and 71 fixed upon the rocker beam shafts 64. The extreme end of the arm 71 is connected by means of a link 72 with the reciprocating member 24 at 73. It will be obvious that as the member 24 reciprocates the rocker beams will operate in unison so as to cause the members of the lower pair of feed plates to approach each other as the members of the upper pair of plates recede from each other and vice versa whereby to obtain the feeding of the articles one by one from the magazine to the chute.

At the lower end of the machine is mounted upon the frame 74 the magazine for the finished articles and comprising uprights 75, which form the walls of the same, and a base 76. The latter is beveled at one side to form an inclined approach at 77 by means of which a space is provided beneath the rear edge of the lowermost article forming the stack within the magazine so as to facilitate the introduction of the next article beneath the stack. The outer edge of the inclined approach 77 is flush with the upper face of a table 78 upon which the articles drop as they leave the chute 47. This table has formed therein a longitudinal groove or guideway 79 within which is mounted for reciprocating movement a plunger 80 which is held within the guide groove by the plates 81 overlying the base of the plunger. This plunger 80 carries at its rear end a pin 82 which is connected by means of a tension spring 83 with an anchoring pin 84 fixed in the frame, said spring exerting its force upon the plunger 80 to press the same in the direction of the magazine and to force the articles dropped on the table into position beneath the stack of articles in the magazine. The plunger is withdrawn after each forward movement by means of a toggle connection including the members 85 and 86 and the arm 87 on the rock shaft 88, the said shaft being connected by means of the arm 89 and the link rod 90 eccentrically to the shaft 23 at 91. The toggle member 86 projects beyond its pivotal connection at 92 with the member 85 as indicated and is provided with a terminal pin 93 which engages the under side of the toggle member 84 so as to prevent the members 84 and 85 assuming a straight position thus guarding against damage to the mechanism, in case the action of the plunger 80 is obstructed, by the "breaking" of the toggle at 92.

In order to insure the delivery of the articles one at a time from the chute to the table in front of the plunger a lock mechanism is provided which comprises a gate bar 94 having upon its two ends fingers 95, 96, said bar being mounted to tilt upon a fulcrum 97 by means of ears 98. One of these ears extends below the fulcrum point and is forked to take over a pin 99 carried by an ear 100 upstanding from a rocking bar 101 pivoted at 102 and having at its opposite ends downturned portions 103, 104, spaced apart a distance corresponding substantially to the stroke of the plunger. The plunger is provided with a stud or roller 105 which extends toward the rocking bar into position to engage the downturned ends 103 and 104 at the limits of its working and return strokes.

It will be seen that as shown in Fig. 9 the lock mechanism has its parts so positioned as to receive and arrest an article descending the chute, the previous article resting upon the table in front of the plunger. As the plunger moves forward and shoves the article into position beneath the stack the roller 105 will lift the downturned end 104 of the rocking bar and tilt the gate 94 so as to retract the finger 96 from the chute and permit the article therein to drop from the chute upon the plunger, while the finger 95 will enter the chute and arrest the advance of the next article. As the plunger moves to the rear the article deposited thereon will fall to a position upon the table and the roller 105 will lift the end 103 causing the rocking bar to move in the opposite direction retracting the finger 95 and lifting the finger 96 to permit the next article to enter the lock, this operation being repeated as the articles are fed from the machine, delivered to the table and added to the bottom of the stack one by one.

I claim:

1. In a power driven machine including a clutch, the combination with a runway for the material passing through the machine, of a finger mounted to reciprocate transversely of the runway, and a connection between the finger and the clutch operating mechanism whereby any irregularity in the motion of the finger due to interruption in the passage of material through the runway will operate the clutch to stop the machine.

2. In a power driven machine including a clutch, the combination with a runway for the individual articles passing through the machine, of a finger mounted to reciprocate transversely of the runway between successive articles passing therethrough, and a connection between the finger and clutch operating mechanism whereby any stopping of the finger by reason of a jam of the articles in the runway will operate the clutch to stop the machine.

3. In a power driven machine including a clutch, the combination with an apertured runway for the articles passing through the machine, a bracket carried by a moving part of the machine, a finger mounted within the bracket for movement into and out of the aperture, a spring bearing on the finger and bracket to hold the finger yieldingly extended in line with the aperture, a latch carried by the bracket and inactive in normal position, the latch and finger having coöperating portions arranged to engage when the motion of the finger is arrested by an obstructing article in the runway to swing the latch into engagement with the clutch operating mechanism whereby to throw out the clutch and stop the machine.

4. In a power driven machine including a clutch, the combination with an apertured runway for the articles passing through the machine, a bracket carried by a reciprocating part of the machine, a finger slidably mounted in the bracket for movement into and out of the aperture, a spring bearing on the finger to hold the same yieldingly extended in line with the aperture, a swinging latch carried by the bracket and inactive in normal position, a latch and finger having coöperative portions arranged to engage when the motion of the finger is arrested by an obstructing article in the runway to swing the latch into engagement with the clutch-operating mechanism whereby to throw out the clutch and stop the machine.

5. In a power driven machine including a clutch, the combination with an apertured runway for the articles passing through the machine, a bracket carried by a reciprocating part of the machine, a finger slidably mounted in the bracket for movement into and out of the aperture, a spring bearing on the finger to hold the same yieldingly extended in line with the aperture, a swinging latch carried by the bracket and inactive in normal position, the finger having a cam face and the latch having a pin arranged to be engaged by the cam face when the motion of the finger with the bracket is arrested by an obstructing article in the runway and to swing the latch into engagement with the clutch operating mechanism whereby to throw out the clutch and stop the machine.

6. In a power driven machine including a clutch, the combination with an apertured runway for the articles passing through the machine, a bracket carried by a reciprocating part of the machine, a finger slidably mounted in the bracket for movement into and out of the aperture, a spring bearing on the finger to hold the same yieldingly extended in line with the aperture, a swinging latch carried by the bracket and inactive in normal position, the finger having a cam face and the latch having a pin arranged to be engaged by the cam face when the motion of the finger with the bracket is arrested by an obstructing article in the runway and to swing the latch outwardly from the finger, clutch operating mechanism including a rock shaft and an arm carried thereby and extending to a point in the path of the outwardly swung latch, the latch adapted to engage the arm to rock the shaft and throw out the clutch to stop the machine upon any interruption of the passage of the articles through the runway.

7. In a power driven machine including a clutch, the combination of a spring tending to throw the clutch out, a catch arranged to hold the clutch in, a transversely apertured gravity chute for the articles passing through the machine, a bracket carried by a reciprocating part of the machine, a finger slidably mounted within the bracket in line with and adapted to pass into and out of the runway aperture, a spring yieldingly holding the finger extended, a latch swinging from the bracket, the finger and latch having a pin and cam face normally inactive but coöperating upon any relative movement due to an obstruction in the aperture to swing the latch outwardly, a lever arm, a connection between the arm and catch, the lever arm disposed in the path of the outwardly swung latch whereby to effect a coupling between the reciprocating part of the machine and the clutch to throw the latter out and stop the machine upon any interruption of the passage of the articles through the chute.

8. In a power driven machine including a clutch, the combination of a spring tending to throw the clutch out, a catch arranged to hold the clutch in, a transversely apertured gravity chute for the articles passing through the machine, a bracket carried by a reciprocating part of the machine, a finger slidably mounted within the bracket in line with and adapted to pass into and out of the runway aperture, a spring yieldingly holding the finger extended, the finger having a cam face on one side, a latch swinging from the bracket, a pin carried by the latch and normally lying adjacent the low part of the cam, a rock shaft, a lever arm projecting therefrom in the path of the outswung latch, a connection between the rock shaft and catch, the parts so arranged that when the articles jam in the chute and obstruct the aperture the recession of the finger against its spring will cause the cam to swing the latch into engagement with the arm and the continued movement of the bracket will release the catch and permit the clutch to be thrown out stopping the machine.

9. In a machine of the character described, an automatic feed comprising a magazine for the articles in superposed relation, upper and lower pairs of feed plates in the lower part of the magazine, a vertically disposed rocker beam at each side of the magazine, a link connection between one end of each beam and a member of the upper pair of feed plates, a link connection between the other end of each beam and a member of the lower pair of feed plates, a connection between the two rocker beams, and a rocking connection between one of the beams and the moving part of the machine, whereby the pairs of feed plates will be reciprocated in timed sequence to feed the articles one by one from the bottom of the magazine.

10. In a machine of the character described, an automatic feed comprising a magazine for the articles in superposed relation, upper and lower pairs of feed plates in the lower part of the magazine, a vertically disposed rocker beam at each side of the magazine, a link connection between the upper end of each beam and a member of the upper pair of feed plates, a link connection between the lower end of each beam and a member of the lower pair of feed plates, a cross connection between the beams above and below their pivots respectively, and a rocking connection between one of the beams and a moving part of the machine whereby the pairs of feed plates will be reciprocated in timed sequence to feed the articles one by one from the bottom of the magazine.

11. The combination with a machine for forming or otherwise acting upon articles in succession, of a magazine for the unformed articles, automatic mechanism driven by the machine to feed the articles from the magazine to the machine, a chute for the articles leading from the machine, a receptacle for a stack of the finished articles, means to receive the articles from the chute and add the same to the bottom of the stack, and means actuated automatically by the jamming of the articles in the chute to stop the machine.

12. The combination with a machine for forming or otherwise acting upon articles in succession, of a magazine for the unformed articles, automatic mechanism driven by the machine to feed the articles from the magazine to the machine, a chute for the articles leading from the machine, a receptacle for a stack of the finished articles, means to receive the articles from the chute and add the same to the bottom of the stack, and means actuated automatically by the jamming of the articles in the chute to stop the machine, said means comprising a clutch, a bracket carried by a reciprocating part of the machine, a finger slidably mounted in the bracket for movement therewith transversely through the chute, a spring bearing on the finger and bracket to hold the finger yieldingly extended, a swinging latch carried by the bracket and inactive in normal position, the latch and finger having coöperating portions arranged to engage when the motion of the finger is arrested by an obstructing article in the chute and to swing the latch outwardly, the clutch operating mechanism including a rock shaft and an arm extending therefrom into the path of the outswung latch, whereby to effect a coupling between the reciprocating bracket and the clutch operating mechanism upon an obstruction of the finger and recession of the same against its spring and thus throw out the clutch and stop the machine.

In testimony whereof I have hereunto signed my name in the presence of two subscribing witnesses.

WILLIAM G. MOFFET.

Witnesses:
M. C. BROWER,
T. D. BUTLER.

Copies of this patent may be obtained for five cents each, by addressing the "Commissioner of Patents, Washington, D. C."